US012725869B2

(12) United States Patent
Hwang

(10) Patent No.: US 12,725,869 B2
(45) Date of Patent: Sep. 1, 2026

(54) BATTERY MODULE, AND BATTERY PACK AND VEHICLE COMPRISING SAME

(71) Applicant: LG ENERGY SOLUTION, LTD., Seoul (KR)

(72) Inventor: Jae-Cheol Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 608 days.

(21) Appl. No.: 18/031,131

(22) PCT Filed: Oct. 28, 2021

(86) PCT No.: PCT/KR2021/015360
§ 371 (c)(1),
(2) Date: Apr. 10, 2023

(87) PCT Pub. No.: WO2022/092876
PCT Pub. Date: May 5, 2022

(65) Prior Publication Data

US 2023/0411762 A1 Dec. 21, 2023

(30) Foreign Application Priority Data

Oct. 28, 2020 (KR) ........................ 10-2020-0141255

(51) Int. Cl.
*H01M 50/244* (2021.01)
*H01M 10/613* (2014.01)
(Continued)

(52) U.S. Cl.
CPC ....... *H01M 50/244* (2021.01); *H01M 10/613* (2015.04); *H01M 10/625* (2015.04);
(Continued)

(58) Field of Classification Search
CPC .......................... H01M 50/244; H01M 50/289
See application file for complete search history.

(56) References Cited

U.S. PATENT DOCUMENTS 6,106,972 A * 8/2000 Kokubo .................. B60L 58/26 429/120
2006/0113965 A1 6/2006 Jeon et al.
(Continued)

FOREIGN PATENT DOCUMENTS

CN 101849265 A 9/2010
CN 104810491 A 7/2015
(Continued)

*Primary Examiner* — Sadie White
(74) *Attorney, Agent, or Firm* — Bryan Cave Leighton Paisner LLP

(57) ABSTRACT

A battery module including: three cell stacks where each of the three cell stacks includes a plurality of battery cells; a cell tray including a base plate on which the three cell stacks are seated, and three split plates disposed upright on the base plate to partition a space so that the three cell stacks may be disposed in spaces separated from each other; a housing for the three cell stacks and the cell tray, where the housing has a hexagonal pillar shape; and a bus bar frame assembly configured to cover an opening formed in an upper portion of the housing, where the bus bar frame assembly electrically connects the plurality of battery cells.

10 Claims, 6 Drawing Sheets

(51) Int. Cl.
*H01M 10/625* (2014.01)
*H01M 10/6556* (2014.01)
*H01M 50/289* (2021.01)
*H01M 50/507* (2021.01)

(52) U.S. Cl.
CPC ..... *H01M 10/6556* (2015.04); *H01M 50/289* (2021.01); *H01M 50/507* (2021.01); *H01M 2220/20* (2013.01)

(56) References Cited

U.S. PATENT DOCUMENTS

2009/0263708 A1* 10/2009 Bender ............... H01M 10/643 429/120
2010/0119929 A1* 5/2010 Gaben ................. H01M 50/227 429/120
2010/0133030 A1* 6/2010 Johnson ................... B62M 6/90 180/68.5
2010/0208862 A1 8/2010 Lorenzo et al.
2014/0302368 A1 10/2014 Wang et al.
2014/0308553 A1 10/2014 Kim
2014/0356675 A1 12/2014 Lee et al.
2017/0005382 A1* 1/2017 Kim .................. H01M 10/0431
2019/0319232 A1 10/2019 Ryu et al.
2020/0243818 A1 7/2020 Sakurai
2020/0251701 A1* 8/2020 Motokawa ........ H01M 10/0587

FOREIGN PATENT DOCUMENTS

CN 209150200 U 7/2019
CN 209822745 U 12/2019
CN 210129528 U 3/2020
CN 111224028 A 6/2020
JP 2020-47452 A 3/2020
JP 2020-119833 A 8/2020
KR 10-2006-0103630 A 10/2006
KR 10-2018-0106688 A 10/2018
KR 10-2020-0008105 A 1/2020

* cited by examiner

BATTERY MODULE, AND BATTERY PACK AND VEHICLE COMPRISING SAME

CROSS-REFERENCE TO RELATED APPLICATIONS

The present application is a US national phase of international application No. PCT/KR2021/015360 filed on Oct. 28, 2021, and claims priority to Korean Patent Application No. 10-2020-0141255 filed on Oct. 28, 2020, the disclosures of which are incorporated by reference as if fully set forth herein.

TECHNICAL FIELD

The present disclosure relates to a battery module, a battery pack including the same, and a vehicle including the battery module, and more particularly to, a battery module with excellent space utilization, excellent structural rigidity and excellent cooling performance, a battery pack including the same, and a vehicle including the battery module.

BACKGROUND

Conventionally, because the shape and size of a space in which a battery pack is installed is very diverse according to the specification of an OEM vehicle, the shape and size of the battery pack was limited in accordance with the specification of the OEM vehicle to be released.

Recently, with the advent of a platform dedicated to electric vehicles, there is a trend where it is possible to freely use 70% to 90% of the area of a lower portion of the vehicle as a space for installing a battery pack. However, despite such a trend, a relatively large amount of dead space is generated because there is inevitably limited space utilization in a specific part of the vehicle, such as near a wheel house, which leads to a loss of energy density.

Accordingly, development of a battery module structure capable of minimizing the occurrence of such a dead space is required to improve energy density which is one of the most important factors in a battery pack for an electric vehicle. In addition, when pursuing excellence in terms of energy density, development of a battery module structure capable of preventing a decrease in cooling efficiency and a decrease in structural rigidity which may occur in return is required.

SUMMARY

The present disclosure is designed to solve the problems of the related art, and therefore the present disclosure is directed to providing a battery module capable of minimizing the occurrence of a dead space when installed in a vehicle by allowing the shape of a battery pack to be freely changed as needed in configuring the battery pack.

The present disclosure is also directed to providing a battery module having an excellent cooling structure and excellent structural rigidity to resolve a large amount of heat generated due to a high energy density.

However, the technical problems to be solved by the present disclosure are not limited to the above problems, and other problems not mentioned will be clearly understood by those skilled in the art from the description of the invention described below.

In one aspect of the present disclosure, there is provided a battery module including: three cell stacks, each including a plurality of battery cells; a cell tray including a base plate on which the three cell stacks are seated, and three split plates disposed upright on the base plate and configured to partition a space so that the three cell stacks are disposed in spaces separated from each other; a housing configured to accommodate the three cell stacks and the cell tray, and having a hexagonal pillar shape; and a bus bar frame assembly configured to cover an opening formed in an upper portion of the housing and electrically connecting the plurality of battery cells of each cell stack.

A planar shape of the base plate may be a hexagon.

Each of the three split plates may extend from a central portion of the base plate to an edge so that seating surfaces for the three cell stacks have the same area.

The cell tray may further include a pin holder extending upward from a central portion of the base plate.

The battery module may further include a mounting pin configured to sequentially penetrate a central portion of each of the bus bar frame assembly and the pin holder from a top to bottom direction.

The mounting pin may have a flow path formed by penetrating a central portion thereof to allow a cooling fluid to pass therethrough.

The housing may include a tray holder configured to support an edge region of the base plate.

The base plate may be exposed through an opening formed in a lower portion of the housing.

Each of the three split plates may be configured to penetrate the base plate to be exposed through the opening formed in the lower portion of the housing.

In another aspect of the present disclosure, there is provided a battery pack and a vehicle including the battery module according to an embodiment of the present disclosure as described above.

According to an aspect of the present disclosure, in configuring the battery pack, it is possible to minimize the occurrence of the dead space when installed in the vehicle by allowing the shape of the battery pack to be freely changed as needed.

According to another aspect of the present disclosure, it is possible to improve the cooling performance and the structural rigidity of the battery pack.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

Figure 2:
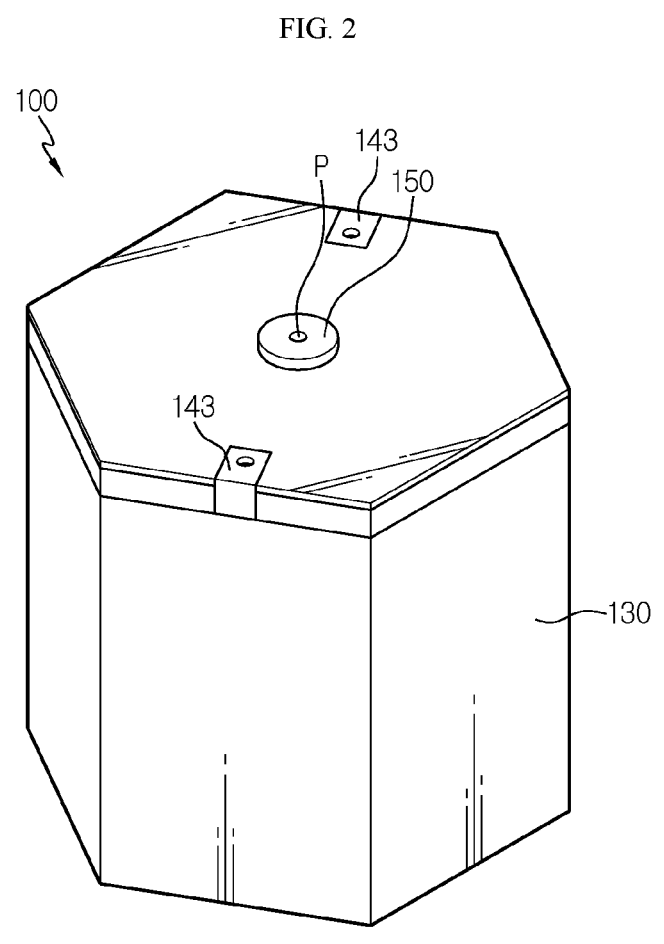

FIG. 2 is an illustration of a battery module according to an embodiment of the present disclosure.

FIG. 3 is an exploded perspective view of the battery module of FIG. 2.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
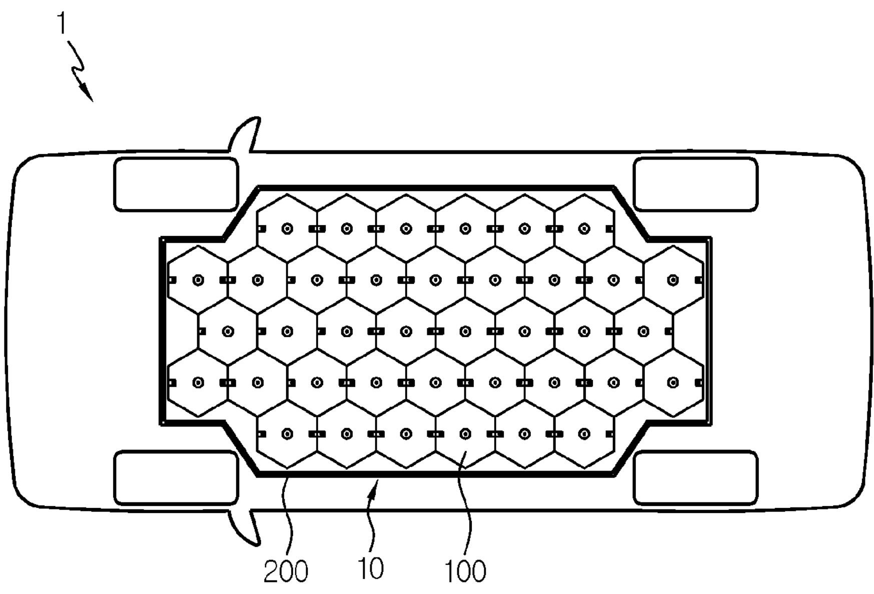
FIG. 1 is an illustration of a lower portion of a vehicle according to the present disclosure.

As illustrated in FIG. 1, a vehicle 1 according to an embodiment of the present disclosure includes a battery pack 10. The battery pack 10 according to an embodiment of the present disclosure includes a plurality of battery modules 100 and a pack tray 200 on which the plurality of battery modules 100 are mounted.

As shown in FIG. 1, a planar shape of the battery module 100 according to an embodiment of the present disclosure is a hexagon. The planar shape of the battery module 100 may be approximately a regular hexagon. The shape of the battery module 100 may greatly improve energy density by minimizing dead space generated between adjacent battery modules 100 when placing the plurality of battery modules 100 in the battery pack. In addition, each of the battery modules 100 has a mounting structure formed in a central portion thereof. That is, each of the battery modules 100 includes a mounting pin 150 penetrating the central portion of the battery module 100 in a height direction of the battery module 100 as will be described below. It is possible to prevent a reduction in energy density because of a space occupied by the structure for fastening when the plurality of battery modules 100 are fastened to the pack tray 200 because of this structure.

As illustrated in FIGS. 2 to 7, the battery module 100 according to an embodiment of the present disclosure includes three cell stacks 110A, 110B, and 110C, a cell tray 120, a housing 130, and a bus bar frame assembly 140. The battery module 100 may further include a mounting pin 150 and/or a module cover 160 in addition to the above-described components.

Each of the cell stacks 110A, 110B, and 110C includes a plurality of battery cells 111. A pouch type battery cell may be used as a battery cell 111. The battery cell 111 includes a pair of electrode leads 111*a* extending in the same direction. The battery cell 111 is disposed upright so that the electrode leads 111*a* face upward in the housing 130.

The cell tray 120 includes a base plate 121 and three split plates 122*a*, 122*b*, and 122*c*. The cell tray 120 may further include a pin holder 123 in addition to the above-described components.

The three cell stacks 110A, 110B, and 110C are mounted on the base plate 121. A planar shape of the base plate 121 is a hexagon. The planar shape of the base plate 121 may be preferably an approximately regular hexagon. The three split plates 122*a*, 122*b*, and 122*c* are disposed upright substantially vertically on the base plate 121. The split plates 122*a*, 122*b*, and 122*c* partition accommodation spaces for the cell stacks 110A, 110B, and 110C together with the base plate 121 in the housing 130 so that the three cell stacks 110A, 110B, and 110C may be disposed in spaces separated from each other.

Each of the three split plates 122*a*, 122*b*, and 122*c* extends from the central portion of the base plate 121 to the edge to partition a seating surface of the base plate 121 so that seating surfaces for the three cell stacks 110A, 110B, and 110C have approximately the same area as each other. The three partitioned seating surfaces form an approximately parallelogram.

Figure 4:
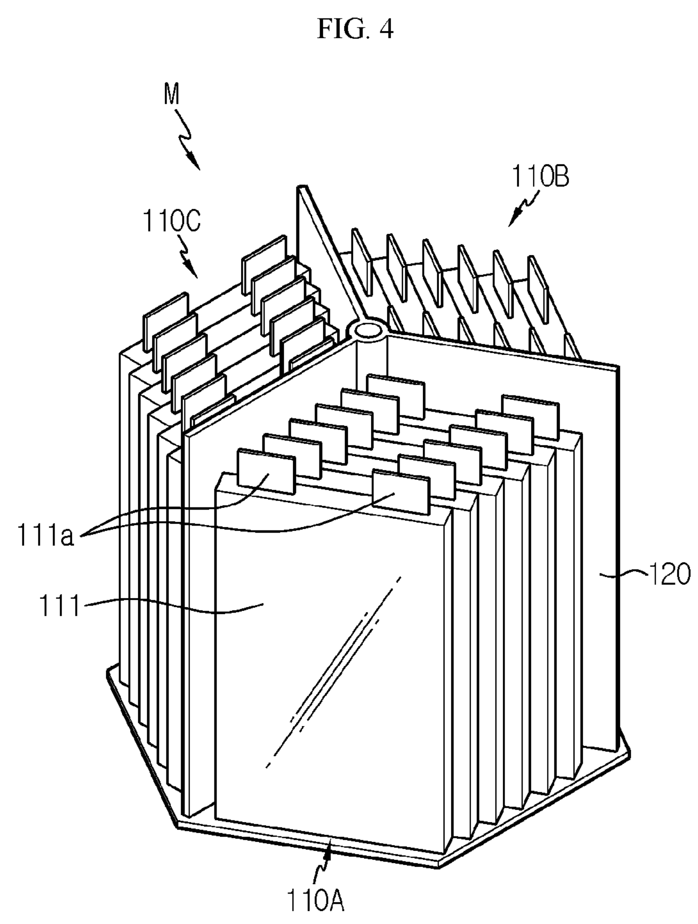
FIG. 4 is an illustration of a sub-module of the present disclosure.
Figure 5:
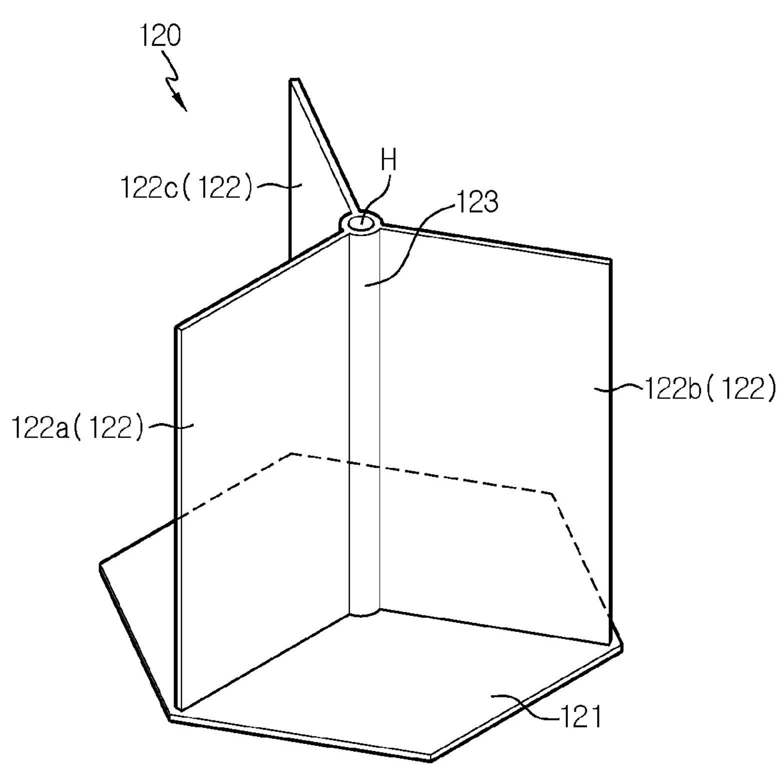
FIG. 5 is an illustration of a cell tray of the present disclosure.

As shown in FIGS. 4 and 5, the first cell stack 110A is disposed in a space partitioned by the first split plate 122*a* and the second split plate 122*b*. The second cell stack 110B is disposed in a space partitioned by the second split plate 122*b* and the third split plate 122*c*. The third cell stack 110C is disposed in a space partitioned by the third split plate 122*c* and the first split plate 122*a*.

The pin holder 123 has a shape extending upward in an approximately vertical direction from the central portion of the base plate 121 and includes a through hole H formed by penetrating a central portion thereof in an extension direction. A mounting pin 150 to be described later is inserted into the through hole H of the pin holder 123.

When the cell tray 120 includes the pin holder 123, each of the three split plates 122*a*, 122*b*, and 122*c* extends from the pin holder 123 toward an edge region of the base plate 121.

The cell tray 120 having the configuration as described above may be made of a metal material to secure structural rigidity and function as a cooling fin. As such, when the cell tray 120 is made of a metal material, a thermal resin may be filled in a contact interface of the cell stacks 110A, 110B, and 110C and the base plate 121 and/or a contact interface between the cell stacks 110A, 110B, and 110C and the split plates 122*a*, 122*b*, and 122*c* to secure insulation between the battery cell 111 and the cell tray 120 and increase thermal conductivity. The thermal resin may not only enhance insulation, but also improve a thermal conductivity between the cell stacks 110A, 110B, and 110C and the cell tray 120. In addition, the cell stacks 110A, 110B, and 110C may be fixed to the cell tray 120 so that the cell stacks 110A, 110B and 110C are prevented from moving because of the filling of the thermal resin.

The housing 130 accommodates a sub-module M including the three cell stacks 110A, 110B, and 110C and the cell tray 120 through an opening portion formed in an upper portion thereof. The housing 130 has an approximately hexagonal pillar shape. The housing 130 may preferably have an approximately regular hexagonal pillar shape. Due to the approximately regular hexagonal pillar shape, when the sub-module M is accommodated in the housing 130, the base plate 121 of the cell tray 120 is in close contact with an inner surface of the housing 130 to prevent the base plate from moving in the housing.

The housing 130 may include a second opening formed in a lower portion thereof for heat dissipation through the cell tray 120, in addition to the first opening formed in the upper portion thereof to accommodate the sub-module M. In this case, the base plate 121 is exposed through the second opening. In addition, each of the three split plates 122*a*, 122*b*, and 122*c* may penetrate the base plate 121 and be exposed to the outside of the housing 130 through the second opening.

Figure 7:
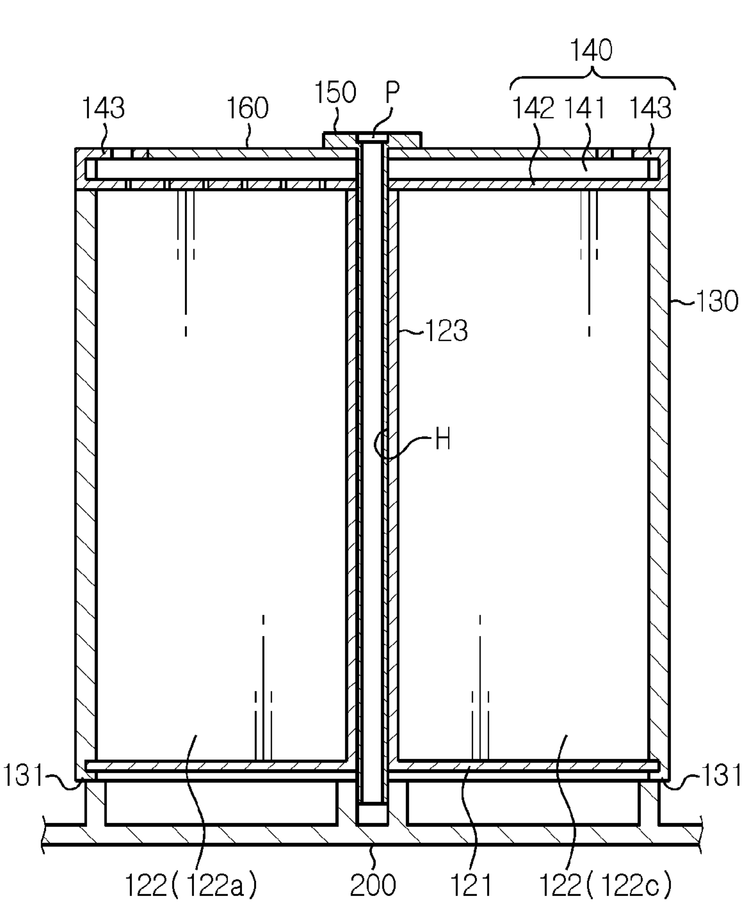
FIG. 7 is an illustration of a battery module according to the present disclosure coupled to a pack tray.

As further illustrated in FIG. 7, when the second opening is formed in the lower portion of the housing 130 as described above, the housing 130 includes a tray holder 131 for supporting the base plate 121. The tray holder 131 is formed in a lower portion of the housing 130 to support the edge region of the base plate 121.

Figure 6:
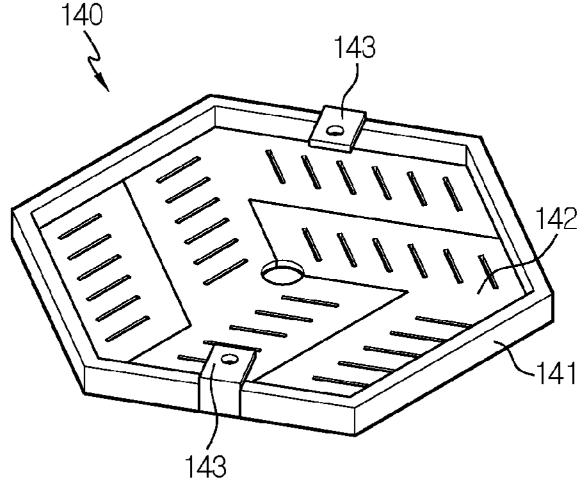
FIG. 6 is an illustration of a bus bar frame assembly according to the present disclosure.

As illustrated in FIG. 6, the bus bar frame assembly 140 covers the first opening formed in the upper portion of the housing 130 and electrically connects the plurality of battery cells 111. The bus bar frame assembly 140 includes a bus bar frame 141, a plurality of bus bars 142, and a pair of module terminals 143.

The bus bar frame 141 is made of an insulating material and has a size and a shape corresponding to the first opening of the housing 130. The plurality of bus bars 142 are disposed on the bus bar frame 141 and are coupled to the electrode lead 111*a* of the battery cell 111. The plurality of battery cells 111 may be connected to each other by the bus bar 142 in series, in parallel, or a mixture of series and parallel. The module terminal 143 is connected to the bus bar 142. The module terminal 143 may function as a connection terminal when electrically connecting the plurality of battery modules 100 to each other.

Figure 3:
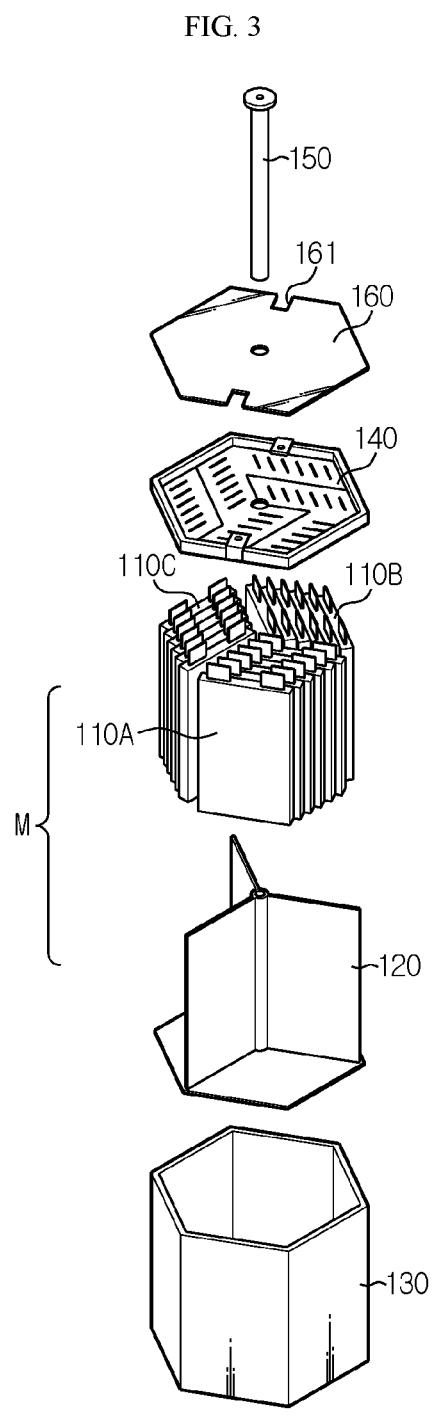

As illustrated in FIGS. 3 and 7, the mounting pin 150 sequentially penetrates a central portion of each of the bus bar frame 141 and the pin holder 123 from the top. When the battery module 100 according to the present disclosure includes a module cover 160 that covers the bus bar frame assembly 140, the mounting pin 150 penetrates a central portion of each of the module cover 160, the bus bar frame 141, and the pin holder 123 from the top.

The mounting pin 150 may include a flow path P formed by penetrating the central portion of the mounting 150 to allow a cooling fluid to pass therethrough. When the flow path P is provided in the mounting pin 150, the cooling fluid flowing through the flow path P discharges heat transferred from the plurality of battery cells 111 to the base plate 121 and/or the split plates 122*a*, 122*b*, and 122*c* to the outside of the battery module 100.

In addition to such a cooling function, the mounting pin 150 may also function as a fixing pin for fixing the plurality of battery modules 100 to the pack tray 200 to form the battery pack 10.

The module cover 160 covers the bus bar frame 141 to protect and insulate the plurality of bus bars 142 disposed on the bus bar frame 141. The module cover 160 has a size and a shape corresponding to the first opening formed in the upper portion of the housing 130. When the module cover 160 is provided, the module terminal 143 provided in the bus bar frame assembly 140 may be exposed to the upper portion through a terminal exposure portion 161 formed in the module cover 160.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module comprising:

first, second and third cell stacks, wherein each of the first, second and third cell stacks comprises a plurality of battery cells;

a cell tray comprising a base plate on which the first, second and third cell stacks are seated in a first, second and third seating areas, respectively, and three split plates disposed upright on the base plate that partition a space so that the first, second and third cell stacks are disposed to be separated from each other by each of the three split plates, respectively;

a housing having a hexagonal pillar shape that accommodates the first, second and third cell stacks and the cell tray; and a bus bar frame assembly that covers an opening formed in an upper portion of the housing, wherein the busbar frame electrically connects the plurality of battery cells of the first, second and third cell stacks, wherein the cell tray further comprises a pin holder extending upward from a central portion of the base plate.

2. The battery module of claim 1, wherein the base plate has a planar hexagonal shape.

3. The battery module of claim 2, wherein each of the first, second and third split plates extends from a central portion of the base plate to an edge portion of the base plate so that the first, second and third seating areas have the same area.

4. The battery module of claim 1, further comprising: a mounting pin that sequentially penetrates, in a direction from a top to a bottom of the mounting pin, a central portion of each of the bus bar frame assembly and the pin holder.

5. The battery module of claim 4, wherein the mounting pin has a flow path formed in a central portion of the mounting pin to allow a cooling fluid to pass through the mounting pin.

6. The battery module of claim 1, wherein the housing comprises a tray holder that supports an edge portion of the base plate.

7. The battery module of claim 6, wherein the base plate is exposed through an opening formed in a lower portion of the housing.

8. The battery module of claim 7, wherein each of the first, second and third split plates penetrates the base plate such that each of the first, second and third split plates is exposed through the opening formed in the lower portion of the housing.

9. A battery pack comprising:

a plurality of battery modules according to claim 1; and a pack tray on which the plurality of battery modules are mounted.

10. A vehicle comprising a battery pack according to claim 9.

* * * * *